United States Patent [19]

Kesting

[11] 4,220,477

[45] Sep. 2, 1980

[54] FLEXIBLE MICROPOROUS CELLULOSIC MEMBRANES AND METHODS OF FORMATION AND USE THEREOF

[75] Inventor: Robert E. Kesting, Irvine, Calif.

[73] Assignee: Nuclepore Corporation, Pleasanton, Calif.

[21] Appl. No.: 953,377

[22] Filed: Oct. 23, 1978

Related U.S. Application Data

[63] Continuation-in-part of Ser. No. 852,776, Nov. 18, 1977, abandoned.

[51] Int. Cl.$^2$ .................... B29D 27/04; C08L 1/18; C08L 1/26
[52] U.S. Cl. ................... 106/195; 106/197 R; 210/500 M; 264/41
[58] Field of Search ............... 264/41, 49; 210/500 M; 106/195, 197

[56] References Cited

U.S. PATENT DOCUMENTS

| | | | |
|---|---|---|---|
| 3,342,729 | 9/1967 | Strand | 210/23 |
| 3,520,960 | 7/1970 | Douglas | 264/49 |
| 3,620,970 | 11/1971 | Klug | 210/23 |
| 3,733,367 | 5/1973 | Perry et al. | 260/669 A |
| 3,852,224 | 12/1974 | Bridgeford | 106/195 |

OTHER PUBLICATIONS

Francis, P. S., *Fabrication and Evaluation of New Ultra-Thin Reverse Osmosis Membranes*, United States Dept. of Interior, Office of Saline Water, Research & Development Report No. 177, Feb. 1966, pp. 38-41.

*Primary Examiner*—Theodore Morris

[57] ABSTRACT

Microfiltration membranes are described comprising 10% to 50% cyanoethylated polysaccharide ether polymers blended with 50% to 90% polymers of cellulose nitrate, cellulose acetate or mixtures of the two. These membranes are flexible and strong and can be readily pleated for use in cartridge filters as well as used flat in conventional single- or multi-plate holders. They are also more thermally stable than conventional "mixed ester" (cellulose nitrate/cellulose acetate) membranes.

8 Claims, No Drawings ns but this technique has not met with marked success.

Ethylcellulose has been found to confer some increase in strength to cellulose nitrate membranes but such membranes are susceptible to dissolution in alcohol which causes blockage of the pores.

It would therefore be highly desirable to have a membrane which would have pores of a size appropriate for use in microfiltraiton processes and yet be strong, flexible, unaffected by the chemical nature of common filtrates, and capable of being autoclaved for sterilization.

FLEXIBLE MICROPOROUS CELLULOSIC MEMBRANES AND METHODS OF FORMATION AND USE THEREOF

CROSS-REFERENCE TO RELATED APPLICATION

This application is a continuation-in-part of Application Ser. No. 852,776 filed Nov. 18, 1977 now abandoned.

TECHNICAL FIELD

The invention herein relates to cellulosic membranes. More particularly, it relates to those membranes formed from cellulose derivatives and having pore sizes and configurations suitable for use in microfiltration processes.

BACKGROUND OF PRIOR ART

Cellulose and its derivatives are well known and have been described in numerous books and publications. See, e.g., Ott et al, eds., "Cellulose and Cellulose Derivatives", *High Polymers*, Vol. V, especially Section IX (Interscience, 1954) and Kirk-Othmer, *Encyclopedia of Chemical Technology*, Vol. 4, pages 593-683 (2d edn., 1967). Microporous membranes composed of cellulose derivatives, primarily cellulose nitrate and/or cellulose acetate are also well known and have been extensively described and studied; see Kesting, *Synthetic Polymeric Membranes* (McGraw-Hill, 1971), especially Chapters 1, 2 and 5. Such membranes find utility in a wide variety of laboratory and commercial processes involving microfiltration.

Microfiltration is a membrane filtration process intended to effect filtration of particles having a size in the range of about 0.1 to about 10 micrometers. Microfiltration is to be distinguished from two other types of processes which also utilize semipermeable membranes for separation: ultrafiltration and reverse osmosis. Ultrafiltration operates at a significantly lower particle size range than microfiltration and is intended for filtration of individual polymer molecules. Reverse osmosis operates at yet lower particle size ranges and is used to filter individual ions. Membranes intended for use in microfiltration have pores which are visible under normal light magnification, while those intended for use in reverse osmosis and ultrafiltration do not show visible pores. (In the past ultrafiltration and microfiltration have sometimes been considered to be synonymous, but current filtration practice and theory now clearly distinguish between the two, such that the membrane materials utilized for microfiltration are not considered to be equivalent to those used for ultrafiltration. See Kesting, op. cit., Chapter 1.

Although the cellulose derivative membranes such as the cellulose nitrate and cellulose acetate "mixed ester" membranes have been used widely for a number of years, they suffer from two serious deficiencies: they are very brittle and they have little thermal stability. They are therefore very susceptible to breaking during handling and must be handled with great caution. Sterilization through autoclaving is obtained only with some difficulty because of the brittleness and low thermal stability. Their brittleness also of course precludes their being folded and therefore they cannot be pleated to make them suitable for use in cartidge filtration units. There have been attempts to alleviate the brittleness problem by incorporating plasticizers into the composi-

BRIEF SUMMARY OF INVENTION

The invention herein is a novel membrane for microfiltration which comprises a combination of cyanoethylated polysaccharide ether polymers and polymers of cellulose nitrate, cellulose acetate, or mixtures of cellulose acetate and cellulose nitrate polymers. In the present membrane the cyanoethylated polysaccharide ether polymers will be present as from 10% to 50% by weight of the composition with the balance of the composition being the cellulose nitrate and/or cellulose acetate polymers.

DETAILED DESCRIPTION OF INVENTION

The ethers useful in the present invention are the cyanoethylated ethers of homopolysaccharides, notably cellulose and chitosan. Preferred among these is cyanoethylcellulose. Cellulose, chitin and the related homopolysaccharides having reactive hydroxyl groups are known to react in the presence of a base with acrylonitrile to form cyanoethylated polysaccharide ethers. Reactions of this type have been described in the Ott et al reference mentioned above, particularly in Section IX-E-9. Consequently, cyanoethylcellulose may be formed by the reaction of acrylonitrile with cellulose in the presence of a base such as dilute sodium hydroxide, while cyanoethylchitosan may be similarly formed.

The novel membranes of the present invention are formed by blending together the cyanoethylated polysaccharide ether polymers and the polymers of cellulose nitrate, cellulose acetate, or a mixture of cellulose acetate and cellulose nitrate. In the blend of this composition the cyanoethylated polysaccharide ether polymers will be present as from about 10% to 50% by weight of the composition, while the cellulose nitrate and/or cellulose acetate polymers will be present as the balance (90% to 50% by weight) of the composition. Whether cellulose nitrate, cellulose acetate, or a mixture of the two types of polymers will be preferred for blending with the ether polymers will be determined by the particular application for which the finished membrane is ultimately to be used, and will be readily determined by those skilled in the art. For most purposes, however, it will be found that the cellulose nitrate polymers will be preferred.

The membranes of the present invention are formed by phase inversion casting in either wet or dry systems in accordance with conventional techniques of the prior art. In such techniques the membranes are cast from a slurry of the polymers and pore forming agents (nonsolvents) dispersed in suitable solvents. The phase inversion process is described in detail in Kesting, op. cit., Section 5.1 and those details need not be repeated here. The phase inversion casting process may be carried out under "wet" or "dry" conditions. These designations refer to the medium in which the final solvent removal after phase inversion is carried out. In the commonly used "dry" process the final solvent removal is carried out in the presence of air or other gaseous medium which is chemically inert to the membrane. In a "wet" process the final solvent removal is carried out in a liquid solution which is also inert chemically to the membrane. The phase inversion casting process may be carried out under any convenient conditions of the type described in the aforementioned Kesting reference. The membrane is cast onto an appropriate substrate commonly in ambient air and at a temperature of approximately 20° C. to 25° C. Membrane thickness is controlled by use of a doctor blade. The particular pore size desired will be determined by control of the reaction conditions in a manner understood by those skilled in the art. The Kesting reference (especially Section 5.2) sets forth the effects of variations in the solubility, concentration, structural regularity, miscibility, volatility and other physical properties of the polymers, solvents and nonsolvents of the types useful herein. For instance, it is known that the higher the solids concentration of the polymer, the smaller will be the pore size of the finished membrane. Solids contents will normally be in the range of about 4.25% to 8.0% by weight, commonly 4.25% to 6.5% and preferably 5.0% to 5.5%. Similarly, the higher the concentration of non-solvents the larger will be the pore size, while the higher the boiling point of the nonsolvent the larger will be the final pore size for a given concentration of nonsolvent. The effects of other variables are also well known. For instance, the higher the processing temperature the smaller will be the final pore size. In a dry process the flow of air or other inert gas should be low enough to prevent "skinning" of the surface of the membrane (i.e. formation of a surface layer with pores of a size less than the pore size required for microfiltration) while yet retaining high enough flow velocity to allow removal of solvent volatiles.

The microfiltration membranes of the invention will have pore size distributions such that average pore sizes are in the range of 0.05 to 10.0 μm, normally 0.1 to 5.0 μm. While the pore sizes of each membrane are not all uniform, the pore size distribution is sufficiently small that one can readily differentiate between membranes having average pore sizes of 0.22 μm, 0.45 μm, 0.65 μm, and so forth.

The preferred solvent or swelling agents for use in the present invention are acetone and acetonitrile, although other materials having similar properties under a given set of reaction conditions in conjunction with the materials of the present compositions can also be used. Similarly, a variety of nonsolvents (pore producing agents) may be used, preferred among which are ethanol and the isomeric propyl and butyl alcohols. The proportions of solvents and nonsolvents may be varied over a wide range as described in Section 5.1 of the Kesting reference. Typically there will be on the order of 50% to 55% solvent and about 40% nonsolvent in the solution or suspension containing the polymers. These proportions may be varied considerably, however, to regulate the rapidity of phase inversion, to compensate for the various types of materials which may be present, and to effect the formation of various sizes of pores.

The following examples will illustrate the novel membranes of the present invention and also their method of manufacture.

EXAMPLE 1

Cellulose from cotton linters or wood pulp is reacted with an equal weight of 2% aqueous sodium hydroxide and acrylonitrile in the ratio of 15 parts by weight of acrylonitrile per part by weight of cellulose to produce cyanoethylcellulose having an 11.9 percent nitrogen content and a degree of substitution (D.S.) of approximately 2.5. The resulting cyanoethylcellulose may be used as produced.

EXAMPLE 2

Chitosan (hydrolyzed chitin) is cyanoethylated as in Example 1 to produce a cyanoethylchitosan which when incorporated into a cellulose nitrate membrane behaves as does the product of Example 1.

EXAMPLE 3

A solution containing 4% cellulose nitrate, 1% cyanoethylcellulose, 54.2% acetone, 23.7% ethyl alcohol, 12.3% n-butyl alcohol, 3.3% water and 1.5% glycerol is allowed to desolvate completely in a dry phase inversion casting process to produce flexible heat resistant membranes having pore sizes suitable for microfiltration. In various experiments using this solution reaction conditions were varied according to the guidelines discussed above to produce membranes having substantially uniform pore sizes in the range of from 0.05 to 5.0 μm.

EXAMPLE 4

A solution similar to that described in Example 3 but containing 1% cyanoethylchitosan instead of cyanoethyl-cellulose is allowed to desolvate partially and then is immersed in water (wet phase inversion casting process) to produce microporous membranes equivalent to those formulated in accordance with Example 3.

EXAMPLE 5

A solution similar to that described in Example 3 but containing 4% cellulose nitrate, 0.5% cellulose acetate, and 0.5% cyanoethylcellulose is utilized in a dry phase inversion casting process to form membranes equivalent to those of Example 3.

EXAMPLE 6

A solution similar to that described in Example 3 but containing 4.5% cellulose acetate and 0.5% cyanoethylcellulose is used in a dry phase inversion casting process to form membranes equivalent to those of Example 3.

For comparison purposes, the properties of membranes formed in accordance with Example 3 above and having average pore sizes of 0.22 μm were compared with commercial 0.22 μm cellulose nitrate-cellulose acetate membranes of the prior art. The commercial materials were all found to be quite brittle such that just ordinary handling and flexing caused rupture of many samples. On the other hand, the membranes of the present invention were quite flexible, to the point where they could be readily bent into tight U-shapes and even creased without rupture of the membrane. In autoclave sterilization tests in which the membranes were placed unrestrained in an autoclave at 261° F. (127° C.) for one hour, the membranes of the prior art not containing any cyanoethylated polysaccharide ethers were found to shrink by approximately 12% to 14%, while the membranes of the present invention shrank only approximately 0.08%. It is thus evident from these tests that the membrane compositions of the present invention are markedly superior to the membranes of the prior art.

STATEMENT OF INDUSTRIAL APPLICATION

The invention herein provides membrane filters for use in a wide variety of industrial and related microfiltration applications, including (but not limited to) filtration of pharmaceuticals, biological materials, foods, aerospace fuels and distilled water used in electronics, pharmaceutical, and aerospace processes. Generally, the filters are used in industrial applications where it is vital that all particulate matter and/or biological material greater than the pore size of the filter must be removed from the filtrate.

I claim:

1. A membrane for microfiltration which comprises a blend of 10% to 50% by weight of at least one cyanoethylated polysaccharide ether polymer and 50% to 90% by weight of at least one polymer selected from the group consisting of cellulose nitrate polymers, cellulose acetate polymers or mixtures thereof.

2. A membrane as in claim 1 wherein said cyanoethylated polysaccharide ether polymer is a polymer of cyanoethylcellulose or cyanoethylchitosan.

3. A membrane as in claim 2 wherein said cyanoethylated polysaccharide ether polymer is a polymer of cyanoethylcellulose.

4. A membrane as in claims 1 or 3 having a pore size distribution with an average pore size in the range of 0.05 to 10.0 $\mu$m.

5. A membrane as in claim 4 wherein the average pore size is in the range of 0.1 to 5.0 $\mu$m.

6. A method of formation of a membrane as in claims 1 or 3 comprising casting said blend of polymers in a wet phase inversion casting process.

7. A method of formation of a membrane as in claims 1 or 3 comprising casting said blend of polymers in a dry phase inversion casting process.

8. A microfiltration process comprising filtering a liquid suspension of particles having sizes in the range of 0.05 to 10.0 $\mu$m through a membrane as in claims 1 or 3.

* * * * *